United States Patent
Ezrielev et al.

(10) Patent No.: US 12,452,082 B2
(45) Date of Patent: Oct. 21, 2025

(54) SYSTEM AND METHOD FOR SECURING DATA PROCESSING SYSTEMS THROUGH RECOGNITION AND ANALYSIS OF COMMANDS

(71) Applicant: Dell Products L.P., Round Rock, TX (US)

(72) Inventors: Ofir Ezrielev, Be'er Sheva (IL); Tomer Kushnir, Omer (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 164 days.

(21) Appl. No.: 18/309,266

(22) Filed: Apr. 28, 2023

(65) Prior Publication Data

US 2024/0364534 A1 Oct. 31, 2024

(51) Int. Cl.
*H04L 9/32* (2006.01)
*G06F 8/65* (2018.01)

(52) U.S. Cl.
CPC .............. *H04L 9/3247* (2013.01); *G06F 8/65* (2013.01)

(58) Field of Classification Search
CPC ......... H04L 9/3247; G06F 8/65; G06F 21/00; G06F 8/60
See application file for complete search history.

(56) References Cited

U.S. PATENT DOCUMENTS

| | | | |
|---|---|---|---|
| 6,742,128 B1 | 5/2004 | Joiner | |
| 7,159,210 B2* | 1/2007 | Griffin | G06F 9/45537 718/1 |
| 7,908,653 B2* | 3/2011 | Brickell | G06F 21/51 709/215 |
| 8,368,915 B1* | 2/2013 | Feeser | G06F 3/1296 358/1.15 |
| 8,516,596 B2 | 8/2013 | Sandoval | |
| 10,540,960 B1* | 1/2020 | Jones | G06N 20/00 |

(Continued)

FOREIGN PATENT DOCUMENTS

WO 2022101656 A1 5/2022

OTHER PUBLICATIONS

Alcaraz, Cristina, and Javier Lopez. "Digital twin: A comprehensive survey of security threats." IEEE Communications Surveys & Tutorials 24.3 (2022): 1475-1503.*

(Continued)

*Primary Examiner* — Jimmy H Tran
(74) *Attorney, Agent, or Firm* — WOMBLE BOND DICKINSON (US) LLP

(57) ABSTRACT

Methods and systems for securing data processing systems are disclosed. The data processing systems may be secured through analysis of recognition and simulation of commands that may be run on data processing systems. An analysis of recognition of the command may be used to query if the command has already been simulated for its effects on the data processing system. If the command may have already simulated the command, then the data processing system may know whether to execute the command. Conversely, if the command may not have been simulated, the command may be simulated to understand the effects on the data processing system. In understanding the effects of the command, the data processing system may formulate whether to execute the command.

20 Claims, 8 Drawing Sheets

(56) References Cited

U.S. PATENT DOCUMENTS

| | | | |
|---|---|---|---|
| 11,184,401 B2 | 11/2021 | Crabtree | |
| 11,750,657 B2 | 9/2023 | Hader | |
| 12,299,430 B2* | 5/2025 | Cardozo | G06F 8/65 |
| 2008/0016339 A1* | 1/2008 | Shukla | G06F 21/54 |
| | | | 713/164 |
| 2008/0282345 A1* | 11/2008 | Beals | G06F 21/71 |
| | | | 726/21 |
| 2010/0031308 A1* | 2/2010 | Khalid | G06F 21/51 |
| | | | 726/1 |
| 2013/0152047 A1* | 6/2013 | Moorthi | G06F 8/71 |
| | | | 717/124 |
| 2015/0026767 A1* | 1/2015 | Sweet | H04L 63/20 |
| | | | 726/1 |
| 2015/0046125 A1 | 2/2015 | Jagiella | |
| 2015/0089502 A1* | 3/2015 | Horovitz | G06F 9/45558 |
| | | | 718/1 |
| 2016/0308895 A1* | 10/2016 | Kotler | G06F 21/577 |
| 2017/0041317 A1* | 2/2017 | Kurian | G06F 21/00 |
| 2017/0041322 A1* | 2/2017 | Kurian | H04L 67/10 |
| 2017/0060607 A1* | 3/2017 | Hollinger | G06F 9/5044 |
| 2017/0214701 A1* | 7/2017 | Hasan | H04L 63/1433 |
| 2019/0034636 A1* | 1/2019 | Gopinath | G06F 21/53 |
| 2019/0173919 A1* | 6/2019 | Irimie | H04L 63/1483 |
| 2019/0196952 A1* | 6/2019 | Manchiraju | G06F 11/3676 |
| 2019/0213104 A1* | 7/2019 | Qadri | H04L 67/1097 |
| 2019/0349426 A1* | 11/2019 | Smith | H04L 63/123 |
| 2020/0048866 A1 | 2/2020 | Weber | |
| 2020/0081445 A1 | 3/2020 | Stetson | |
| 2020/0092322 A1* | 3/2020 | Boss | H04L 63/1466 |
| 2020/0250295 A1* | 8/2020 | Padmanabhan | H04L 63/102 |
| 2020/0411168 A1 | 12/2020 | Thomas | |
| 2021/0097186 A1* | 4/2021 | Mandal | G06F 21/552 |
| 2021/0168175 A1 | 6/2021 | Crabtree | |
| 2021/0211438 A1* | 7/2021 | Trim | G06N 20/00 |
| 2021/0248229 A1* | 8/2021 | Kras | H04L 51/08 |
| 2022/0114310 A1 | 4/2022 | Berti | |
| 2022/0137611 A1 | 5/2022 | Naito | |
| 2022/0210200 A1 | 6/2022 | Crabtree | |
| 2022/0253534 A1* | 8/2022 | Biswas | G06F 21/577 |
| 2022/0299988 A1 | 9/2022 | Nair | |
| 2022/0327476 A1 | 10/2022 | Shanmugavelayudam | |
| 2023/0077780 A1* | 3/2023 | Decrop | G06N 20/00 |
| | | | 726/23 |
| 2023/0082761 A1 | 3/2023 | Ruan | |
| 2023/0367911 A1* | 11/2023 | Balber | G06N 3/0464 |
| 2023/0376236 A1* | 11/2023 | Langer | G06F 3/067 |
| 2024/0003242 A1 | 1/2024 | Ambade | |
| 2024/0077867 A1 | 3/2024 | Mene | |
| 2024/0089284 A1 | 3/2024 | Rieger | |
| 2024/0169050 A1* | 5/2024 | Gehtman | G06F 21/57 |
| 2024/0177067 A1 | 5/2024 | Ezrielev | |
| 2024/0273411 A1* | 8/2024 | Mueck | H04L 9/3263 |
| 2024/0348664 A1* | 10/2024 | Mohanram | H04L 63/02 |
| 2024/0354657 A1 | 10/2024 | Li | |
| 2024/0362145 A1 | 10/2024 | Ezrielev | |
| 2024/0364534 A1 | 10/2024 | Ezrielev | |
| 2025/0007945 A1 | 1/2025 | Rieger | |
| 2025/0039236 A1 | 1/2025 | Ignatius | |
| 2025/0133017 A1* | 4/2025 | Langer | G06F 3/067 |

OTHER PUBLICATIONS

Masi, Massimiliano, et al. "Securing critical infrastructures with a cybersecurity digital twin." Software and Systems Modeling 22.2 (2023): 689-707.*

Wang, Haozhe, et al. "A graph neural network-based digital twin for network slicing management." IEEE Transactions on Industrial Informatics 18.2 (2020): 1367-1376. (11 Pages).

Almasan, Paul, et al. "Digital twin network: Opportunities and challenges." arXiv preprint arXiv:2201.01144 (2022). (7 Pages).

Hu, Weifei, et al. "Digital twin: A state-of-the-art review of its enabling technologies, applications and challenges." Journal of Intelligent Manufacturing and Special Equipment 2.1 (2021): 1-34. (34 Pages).

Khan, Latif U., et al. "Digital-twin-enabled 6G: Vision, architectural trends, and future directions." IEEE Communications Magazine 60.1 (2022): 74-80. (7 Pages).

Nguyen, Huan X., et al. "Digital twin for 5G and beyond." IEEE Communications Magazine 59.2 (2021): 10-15. (13 Pages).

Wang, Danshi, et al. "The role of digital twin in optical communication: fault management, hardware configuration, and transmission simulation." IEEE Communications Magazine 59.1 (2021): 133-139. (6 Pages).

Pang, Toh Yen, et al. "Developing a digital twin and digital thread framework for an 'Industry 4.0' Shipyard." Applied Sciences 11.3 (2021): 1097. (22 Pages).

Isto, Pekka, et al. "5G based machine remote operation development utilizing digital twin." Open Engineering 10.1 (2020): 265-272. (8 Pages).

Rovira-Sugranes, Arnau, et al. "A review of AI-enabled routing protocols for UAV networks: Trends, challenges, and future outlook." Ad Hoc Networks 130 (2022): 102790. (30 Pages).

Esteban, Jonathan, "Simulating Network Lateral Movements through the CyberBattleSim Web Platform", Diss. Massachusetts Institute of Technology, 2022, pp. 1-66 (66 pages).

Juan R. Trocoso-Pastoriza et al., "Orchestrating Collaborative Cybersecurity: A Secure Framework for Distributed Privacy-Preserving Threat Intelligence Sharing", arXiv:2209.02676v1, Sep. 6, 2022, retrieved from "arXiv preprint arXiv:2209.02676", pp. 1-31 (31 pages).

Thomas Kunz et al., "A Multiagent CyberBattleSim for RL Cyber Operation Agents", 2022 International Conference on Computational Science and Computational Interllogence (SCCI), Las Vegas, NV, USA, 2022, pp. 897-903 (7 pages).

Viadislav D. Veksler et al., "Simulations in Cyber-Security: A Review of Cognitive Modeling of Network Attackers, Defenders, and Users", Frontiers in Psychology, vol. 9, No. 691, May 15, 2018, pp. 1-12 (12 pages).

Igor Kotenko et al., "Agent-based modeling and simulation of botnets and botnet defense", Conference on Cyber Conflict, CCD COE Publications, Tallonn, Estonia, 2010, pp. 21-44 (24 pages).

* cited by examiner

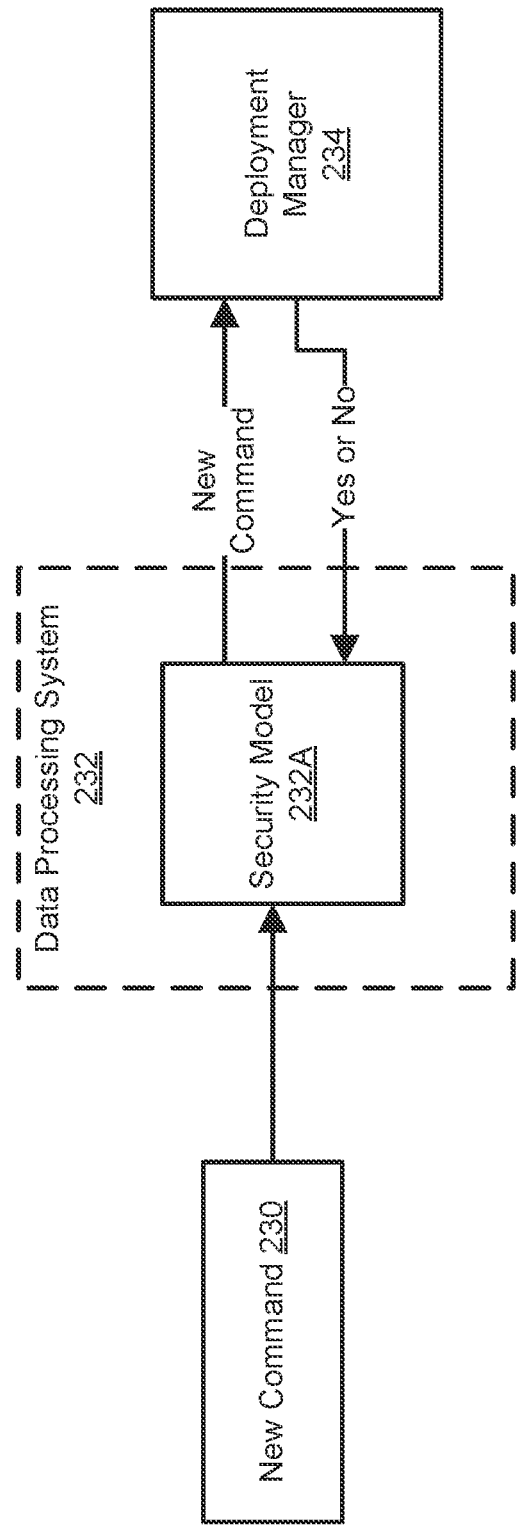

SYSTEM AND METHOD FOR SECURING DATA PROCESSING SYSTEMS THROUGH RECOGNITION AND ANALYSIS OF COMMANDS

FIELD

Embodiments disclosed herein relate generally to device management. More particularly, embodiments disclosed herein relate to managing devices using security models.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 2C shows a third data flow diagram illustrating operation of a portion of a system in accordance with an embodiment.

DETAILED DESCRIPTION

Figure 1:
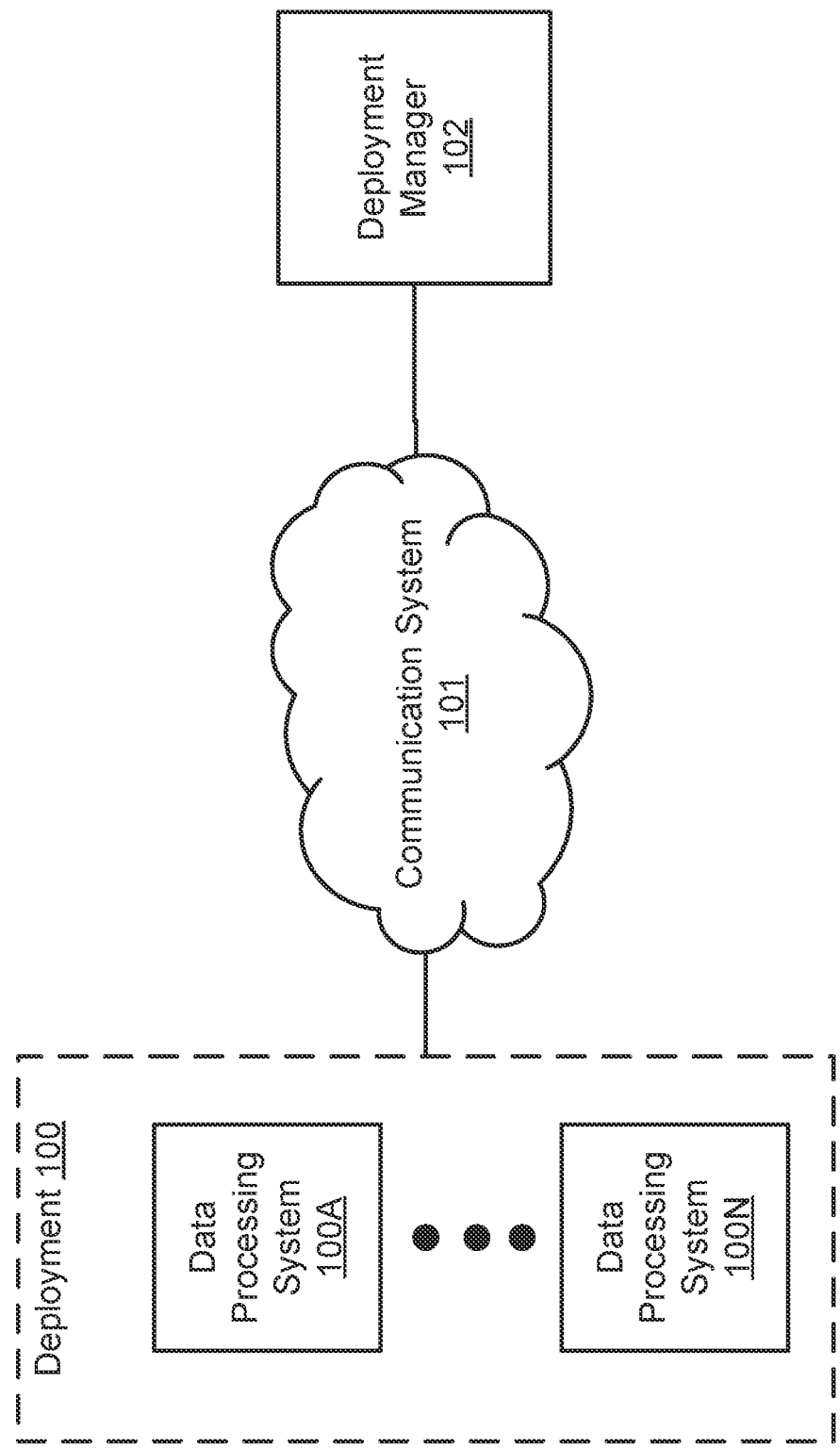
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate the methods and systems for securing data processing systems. Data processing systems may be secured through the analysis of recognition and simulation of commands that may be run on data processing systems.

In the analysis of recognition, a command may be received by a data processing system. In receiving the command, the data processing system may check the cryptographic signature by the remote user that initiated the command. If the cryptographic signature of the command may not be from a trustworthy source, the command may be discarded. Otherwise, if the command may not be discarded, the cryptographic signature may be found the be from a trustworthy source. Even if the cryptographic signature associated with the command may be from a trusted source, the data processing system may assume zero trust of the remote user.

In taking a zero-trust approach with a command, the data processing system may query its command library for a record of the command. If a record may be found, the data processing system may include a pre-simulated decision on whether to execute the command. If a pre-simulated decision may exists in the command library, the data processing system may follow the pre-simulated decision whether to execute the command.

Conversely, if the pre-simulated decision may not be found in the command library, a record of a pre-simulated decision may not exist in the command library of the data processing system. Because a record of the pre-simulated decision may not exist in the command library, the data processing system may not understand the impact or benefit of executing the command.

To understand the impact or benefit of the command, a deployment manager may simulate the command on a digital representation of the data processing system. Alongside the simulation of the command, if a time sensitivity level may exist, then the command may be push to ahead in a buffer that may hold other commands. In addition to the time sensitivity level, a subject matter expert may be assigned to execution and analysis of the command.

After execution of the command, and analysis of the command for any impact or benefit to the digital representation of the data processing system, a decision may be formulated. Upon formulation of a decision, the decision may be used to resolve whether to execute the command on the data processing system. Further, the decision associated with the command may be stored in the command library of the data processing system. In storing the decision of the command library, the decision may be considered as a pre-simulated decision should the same command be received again by the data processing system.

In an embodiment, a method for securing a deployment is disclosed. The method may include obtaining, by a data processing system of the deployment, a command and making a first determination regarding whether the command is from a trusted entity. In a first instance of the first determination where the command is from the trusted entity, second determination may be made regarding whether a pre-simulated scenario for the command and a corresponding resolution for the command is available. In a first instance of the second determination where the pre-simulated scenario for the command and the corresponding resolution for the command is available, the command may be implemented when the corresponding resolution indicates performance of the command, and the command may be discarded without implementation when the corresponding resolution indicates that the command is to be ignored. In a second instance of the second determination where the pre-simulated scenario for the command and the corresponding resolution for the command are not available, performance of a simulated scenario may be initiated for the command to obtain the corresponding resolution for the command, the command may be implemented when the corresponding resolution indicates performance of the command, and the command may be discarded without implementation when the corresponding resolution indicates that the command is to be ignored.

In a second instance of the first determination where the command is not from the trusted entity, the method may further include discarding the command without implementation.

The pre-simulated scenario is based on a digital twin, and the corresponding resolution is based on an evaluation of operation of the digital twin under influence of the command.

The pre-simulated scenario and the corresponding resolution may be obtained from a deployment manager that uses the digital twin to manage multiple data processing systems in the deployment.

In the second instance of the second determination where the pre-simulated scenario for the command and the corresponding resolution for the command are not available, the command may be added to a buffer comprising commands to be implemented once the pre-simulated scenario for the commands and the corresponding resolutions are available.

In the second instance of the second determination where the pre-simulated scenario for the command and the corresponding resolution for the command are not available, a time sensitivity level may be identified for implementation of the command and the command may be expedited based on the time sensitivity level obtainment of the corresponding resolution of the pre-simulated scenario, and Expediting the obtainment may include initiating review for the command by a subject matter expert to obtain an analysis of the command, and obtaining the corresponding resolution based on the analysis of the command by the subject matter expert.

Expediting the obtainment may include prioritizing the performance of a simulated scenario for the command to obtain the corresponding resolution.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, the system of FIG. 1 may include deployment 100. Deployment 100 may provide all or a portion of the computer-implemented services. To provide its functionality, deployment 100 may include any number of data processing system 100A-100N.

To provide the computer implemented services, any of data processing systems 100A-100N may operate based on commands received from a remote source. The remote source may be a user, another data processing system, or any other type of entity. Whether the remote source may be a user, another data processing system, or any other type of entity, the identity of the remote source may need to be verified. In verification of the identity of the remote source, it may be assured that the remote source may be a trustworthy entity who has authorization to operate a data processing system and may be allowed to execute commands on the data processing system.

However, by allowing commands to be executed by a remote source, a threat to the security of a data processing may be presented. If a malicious entity is able to cause a command to be executed, the resulting execution may not be for the benefit of the data processing system or permit destructive activity for the data processing system. With the execution of a command not benefiting the data processing system or permitting destructive activity of the data processing system, authentication of the remote source may be necessary to ensure that any command run by the remote source may be for the benefit of the data processing system.

With the remote source being a user or data processing system, operations based on commands from the remote source may be authenticated through authentication of the identity of the user or data processing system. Authentication of the user or data processing system may include verification of a username, password, two-factor authentication, location by way of an internet protocol (IP) address, matching answers to a predetermined set of questions by the user or data processing system, and/or other type of process. With authentication, the data processing system that receives the commands may assume that the commands run by the authenticated user or data processing system may be secure or may benefit the data processing system.

Concerning any security that may be provided by authentication or benefit expected to the data processing system, the expectation of security may not hold when the malicious actor may be assumed either to have acquired any necessary credentials or privileges to be authenticated or to have bypassed any authentication steps entirely. If the malicious actor was authenticated by the data processing system, the malicious actor may have obtained the authentication credentials through legitimate means, such as being an authorized user to the data processing system. However, the malicious actor may have obtained the authentication credentials through illegitimate means, such as obtaining the credentials through phishing techniques or malware.

In either means of which the authentication credentials were obtained, the malicious actor may now have access to the data processing system. In having access to the data processing system, the commands that may be run by the malicious actor may only be expected to further compromise the data processing system. In running commands that may further compromise the data processing system, the result of the commands by a malicious actor may only serve to the detriment of the data processing system.

Not only could a malicious actor run commands directory after gaining the authentication credentials, but the malicious actor may also implement a command and control (C2) attack. Through use of the authentication credentials, the malicious actor could establish communication between the data processing system and a malicious C2 server. In establishing the communication, the malicious C2 server may be ready to send commands and receive any data from the data processing system. Beyond the establishment of communication with one data processing system, the malicious C2 server may establish communication simultaneously with multiple compromised data processing systems. In establishing communication simultaneously with multiple compromised data processing systems, the malicious C2 server may maintain control over a botnet, which is a network of infected computers ready to receive malicious commands. Botnets may be useful in overwhelming data processing systems by overwhelming them with traffic, to the point of that the data processing system may need to be shut down.

Other commands that may be run in a compromised system may include (i) uninstalling monitoring agents, (ii) disabling firewalls, (iii) disabling security modules, and (iv) extraneous functionality.

Monitoring agents may be software that continuously scan data processing systems. In continuous scanning, monitoring agents may alert the administrator when potential problems arise, such as the installation of malicious or unknown software or the occurrence of new activities that have not been authenticated by an administrator. In addition to alerting for potential problems and new activities, monitoring agents may periodically run diagnostics, update software, or check for software updates, and run antivirus programs.

As monitoring agents may run general maintenance in the form of software scanning and updates, and diagnostics, a malicious actor may benefit in running commands on data processing systems that may be normally filtered by a monitoring agent. To benefit by running such a command, the malicious actor may need to turn off the monitoring agent. By turning off the monitoring agent, the malicious actor may run commands to the detriment of the data processing system to fulfill any malicious actions that they see fit.

Firewalls may be network-security devices that monitor incoming and outgoing network traffic to allow or deny incoming and outgoing traffic based on a set of security rules. In monitoring network traffic, firewalls may allow or block traffic based on state, port, or protocols. Beyond allowing or denying incoming and outgoing traffic, firewalls may have evolved to include more capabilities. In the inclusion of more capabilities, next-generation firewalls may include capabilities such as access controls, blocking risky software, and filtering uniform resource location (URL) based on geolocation or reputation.

As firewalls may monitor the network-gateways of a data processing system, a malicious actor may benefit by disabling the firewall. In disabling the firewall, for example, a malicious actor may be able to change access controls. In changing access controls, authentication credentials may be changed or removed to enable access to important or privileged data. In addition to access to data, a malicious actor may be able to install any software that fulfills a malicious purpose with the data processing system. As uncertain as the consequences of permitting installation of any software for malicious purposes, by disabling a firewall, a malicious actor may permit access to URLs that may have been previously filtered. In permitting access to URLs that may have been previously filtered, a malicious actor may use a data processing system to access potentially unsafe websites that may further permit compromise of a data processing system. Through disabling a firewall by a malicious actor, malicious commands may be run that may further compromise the data processing system or the data that it may hold.

Security modules may be devices that provide additional security for sensitive data. They may include plugin cards, or be embedded in other hardware including smart cards, appliances. In addition to being embedded in hardware, they may be connected to network server, serve as a stand-alone device, or exist in a cloud communication system. In any form of hardware, security modules may implement cryptographic functions, mainly digital keys, performs encryption and decryption, and strong authentication, not being limited to two-factor or multi-factor authentication. Security modules may also provide a secure enclosure to run special algorithms or corporate-related code which may need to be run in a controlled environment. Security modules may be constructed developed with programming languages such as C++, .NET, Java, or other languages. They may even be responsible for running operating systems or commercial off-the-shelf software. Whatever security functions or programming may be run, security modules may be held to publicly known set of standards as specified by the Federal Information Processing Standards (FIPS) as set by the National Institute of Standards and Technology (NIST).

Disabling of a security module by a malicious actor may have unsecure and dangerous ramifications. In the disabling of security module, an assumption may be that the malicious actor may have administrator access to the security module. If the malicious actor may have administrator access to the security module, then the malicious actor may have access to the cryptographic keys that the security module may use to send encrypted messages. If the malicious actor permits use of the security module, then the malicious actor may be able to decrypt any messages sent through the security module. In disabling the security module, any authentication, two-factor or multi-factor, may not be possible. In authentication not being possible, access to or through the security module to a data processing system may be less restricted or completely open to unauthorized users. In opening the data processing system to unauthorized users, all business transactions that may be done through the security module may be made public for viewing by unauthorized users. In addition to turning private transactions into public affairs, disabling the security module, as it may imply that the malicious actor may have control over the security module, may also imply that the malicious actor has control over the special algorithms or corporate-related code that may be run by the security module. In having control over the corporate-related code, the malicious actor may steal code, or use the code in conjunction with their own software to accomplish malicious tasks. The disabling of a security module by a malicious actor may lead not only an unsecure data processing system, but it may lead also to a security module over which a malicious actor exerts control.

The execution of extraneous functionality may also have unsecure ramifications. In the execution of extraneous functionality, a malicious actor may initiate functionality that may not be necessary. In running functionality that may not be necessary, the malicious actor may waste computing resources. In wasting computing resources, a data processing system may become compromised.

Based on the potential for malicious activity and security protocols that could be bypassed by a remote source, be it a user, another data processing system, or any other type of entity, even commands that can be validated may still be disadvantageous or lacking any benefit for a data processing system to execute. As commands that are validated may still be disadvantageous or lacking any benefit for a data processing system to execute, a security model that scrutinizes the effects and result of the command in order to validate the command may benefit the data processing system.

To improve the reliability of commands run on data processing systems, the system of FIG. 1 may implement a framework for data processing systems to rely on security models deployed for execution of commands. In executing commands for the data processing system, the security model may scrutinize the effects and result of the command in order to validate the command. In validating the command, the security model may ensure that the command benefits the data processing system or may work towards constructive action with the data processing system.

To implement the framework, the system of FIG. 1 may include deployment manager 102. Deployment manager 102 may include one or more security models and a digital twin. The digital twin may be a digital representation of data processing systems 100A-100N. The digital twin may mimic the architecture of, processes performed by, and qualities of data processing systems 100A-100N. For example, the processes may include input and output processes and responses, which may render the digital twin indistinguishable from the real-world counterpart (i.e., data processing systems 100A-100N in this example). Through use of the digital twin, deployment manager 102 may be able to simulate operation of real-world systems to monitor and/or analyze any process similar to the processes performed by data processing systems 100A-100N. In other words, the digital twin may respond in a manner similar if not the same as that of data processing systems 100A-100N.

In working to validate any command run on a data processing system, the security model of deployment manager 102 may check if the command could cause deployment mistakes or malicious actions, be they intended or unintended, on the digital twin. The security model may ensure first that the command has not already been run. To check if the command has not already been run, the security model may inquire of the data processing system if the command is recognized as having been run. If the command has been run, then the data processing system can mark the command as already validated. If the data processing system has not marked the command as validated, then the security model may construct a scenario in which to run the command. In addition to constructing a scenario to run the command, the command may be added to a buffer comprising commands to be run by the security model. In addition to adding the command to a buffer, the command may be labeled with a time-sensitivity label. If the time-sensitivity label may be at or above a certain value, then an intervention may be implemented involving a subject matter expert. Otherwise, if the time-sensitivity label is below a certain value, then the command may run at its place in the buffer. No matter its place in the buffer, the command may be run by the security model and the corresponding resolution may be retrieved.

Upon retrieving the corresponding resolution, the corresponding resolution may be used to validate the command. Once a command is validated by the security model, the corresponding resolution may be noted in the data processing system in deployment 100 and the security model may be deployed to the data processing system. After deployment to the data processing system, the security model may be exposed to other commands. As the security model may be exposed to new commands, the security model may be expected to validate new commands that may be executed in a data processing system through deployment 100. As it may be necessary to validate more commands, the validation process may be repeated with the security model and the corresponding resolutions of new commands may be noted with the data processing system alongside an update security model.

Any of data processing systems 100A-100N and/or deployment manager 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 101. In an embodiment, communication system 101 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

Figure 2A:
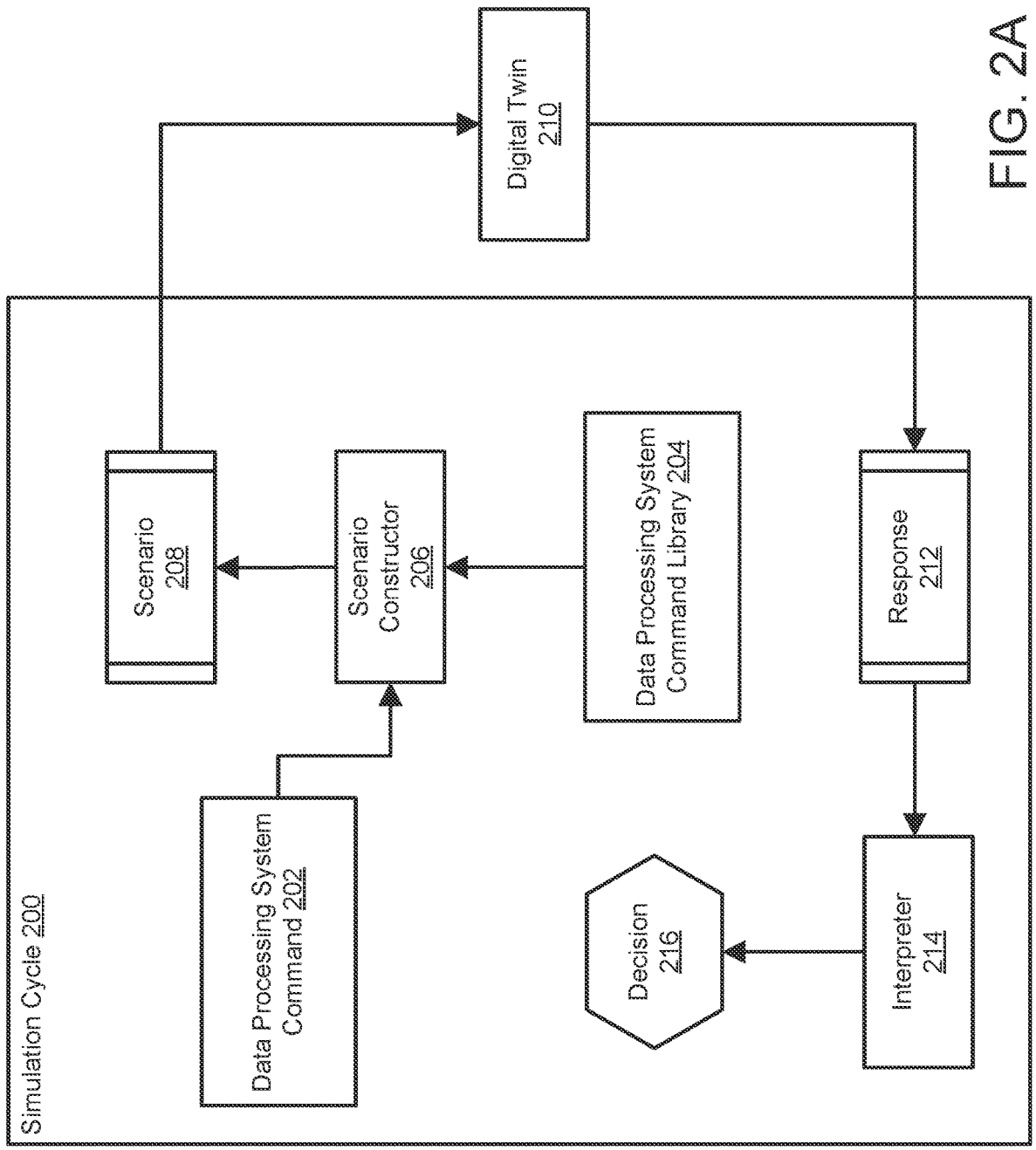
FIG. 2A shows a first data flow diagram illustrating operation of a portion of a system in accordance with an embodiment.
Figure 2B:
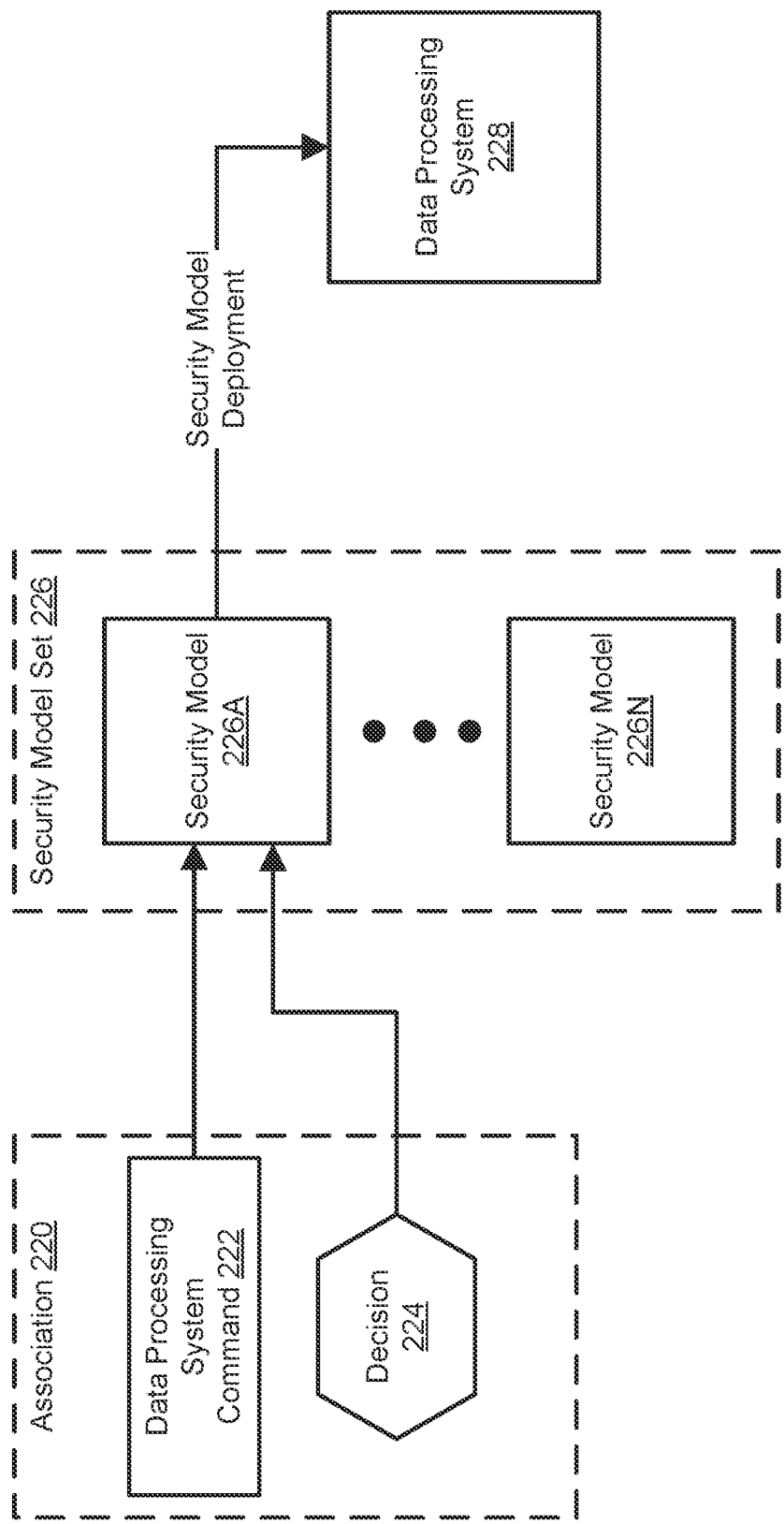
FIG. 2B shows a second data flow diagram illustrating operation of a portion of a system in accordance with an embodiment.
Figure 2D:
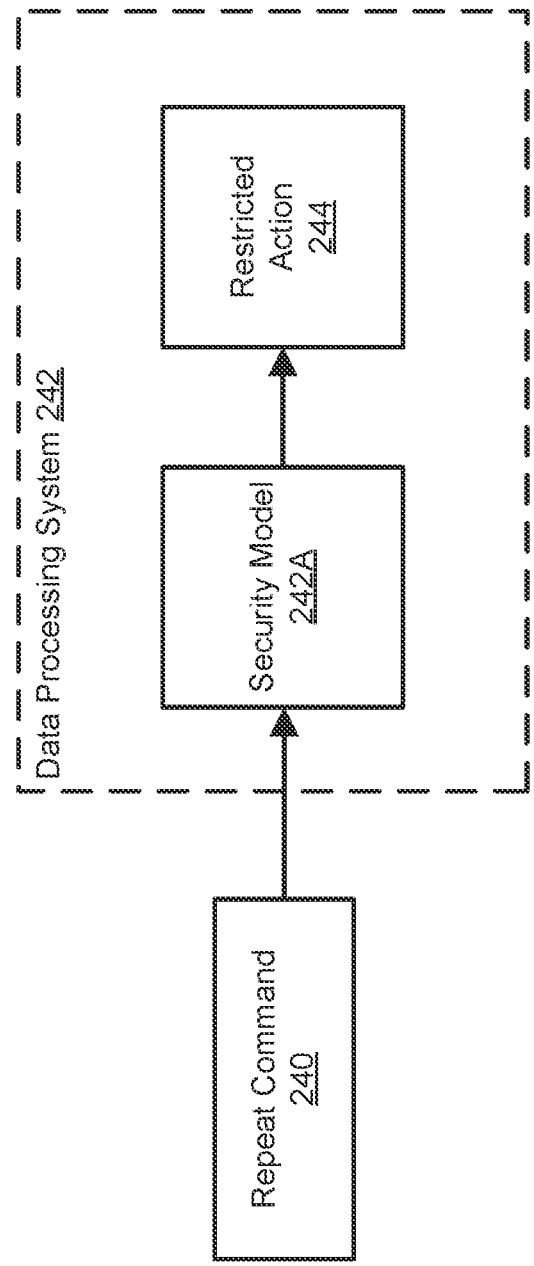
FIG. 2D shows a fourth data flow diagram illustrating operation of a portion of a system in accordance with an embodiment.

To further clarify embodiments disclosed herein, data flow diagrams are shown in FIG. 2A-2D. These data flow diagrams show flows of data that may be implemented by the system of FIG. 1. In FIG. 2A, simulation cycle 200 is illustrated. In FIG. 2B, association 220 is made with security model 226A within security model set 226 followed by deployment of that security model to data processing systems 228. In FIG. 2C, new command 230 is given to security model 232A within data processing systems 232 to run within deployment manager 234. In FIG. 2D, repeat command 240 is given to security model 242A, which responds with rejecting restriction action 244 within data processing systems 242.

Turning to FIG. 2A, a diagram illustrating simulation cycle 200 in accordance with an embodiment is shown. Simulation cycle 200 may regulate the development of a security model that implements a command given by a data processing system. In implementing a command given by a data processing system, the security model may qualify the benefit of the command for a data processing system. To qualify the benefit of the command, the security model may simulate the command with a digital twin representing the data processing system. Once the command has been simulated by the security model, the security model may be deployed to the data processing system.

Simulation cycle 200 may begin with a data processing system and data processing system command 202 to be executed. The data processing system may note that data processing system command 202 may have been cryptographically signed, which may indicate that the command may have been given by a trusted source. However, the data processing system may assume zero-trust in commands, given the possibility that the trusted source may be a malicious actor. For the possibility that the trusted source may be a malicious actor, the data processing system may confirm the benefit to the data processing system in running the command. To confirm the benefit in running the command, the data processing system may query data processing system command library 204. In querying data processing system command library 204, the data processing system may establish whether data processing system command 202 and its corresponding resolution may already exist within data processing system command library 204, which may be a repository for pre-simulated commands. If data processing system command 202 and its corresponding resolution may already exist within data processing system command library 204, then the corresponding resolution may be returned to the data processing system which sent data processing system command 202.

Conversely, if data processing system command 202 and its corresponding resolution may not exist within data processing system command library 204, scenario constructor 206 within the security model may proceed with the construction of scenario 208. Scenario 208 may be defined by the environment in which the command may be implemented. Scenario 208 may be fed to digital twin 210, which may be a digital representation of the data processing system that provided data processing system command 202. Within digital twin 210, scenario 208 may be simulated. The effects on digital twin 210 from the simulation of scenario 208 may be represented as response 212.

Response 212 may be fed to interpreter 214, which may evaluate the effects on digital twin 210 from the simulation of scenario 208. In evaluating the effects on digital twin 210 from the simulation of scenario 208, interpreter 214 may pass decision 216. Decision 216 may give indication on the quality of the command on digital twin 210 and ruling on whether any benefit, security, or operation may be affected by the command on digital twin 210. In giving indication on the quality and ruling on the benefit of the command on digital twin 210, decision 216 may rule if the command may be permitted to be run on the data processing system represented by digital twin 210 and which passed data processing system command 202 to simulation cycle 200.

Data processing system command 202 may be implemented using one of more data structures that includes information pertaining to a command. The command may be used to run a process on the data processing system associated with data processing system command 202. In running the process, instruction of the command may be followed by the data processing system.

Data processing system command 202 may be any command which the corresponding data processing system may be instructed to run. While being instructed to run data processing system command 202, the corresponding data processing system may pass the command to simulation cycle 200 associated with a security model to evaluate the command based on any benefit or security that may be gained from running the command. As an example, data processing system command 202 may be a cryptographically signed command to disable the firewall that may be active on the corresponding data processing system. As this may be a cryptographically signed command, the source of the command may be verified. Despite that the command may be cryptographically signed, in order to verify any benefit of the command to the data processing system, the data processing system may begin the simulation cycle to evaluate the command based on simulating the command with a virtual representation of the data processing system, that is, digital twin 210.

Data processing system command library 204 may be implemented using one or more data structures that includes information pertaining to a set of commands. The information pertaining to a set of commands may include evaluations of commands that may have been run in other cycles of simulation cycle 200. In already having been run in other cycles of simulation cycle 200, the set of commands may include a set of values for decision 216 which permits or restricts execution of the corresponding command.

In the previous example, data processing system command 202 may have been defined as a command to disable the firewall on the corresponding data processing system. Given data processing system command 202, simulation cycle 200 may require querying data processing system command library 204. In querying data processing system command library 204, the security model may check if the command to disable the firewall has already been evaluated in a previous cycle of simulation cycle 200. If the command to disable the firewall had already been evaluated, data processing system command library 204 may return a corresponding resolution that may have been stored for that command. If the command to disable the firewall may not have already been evaluated, then the security model in simulation cycle 200 may utilize scenario constructor 206 to create scenario 208.

Scenario constructor 206 may be implemented using a process by which a scenario for evaluation of data processing system command 202 may be created. To begin evaluating data processing system command 202, not only may scenario constructor 206 need to know the contents of data processing system command 202, but it also may need to know if a corresponding resolution exists for data processing system command 202 within data processing system command library 204. Assuming no corresponding resolution for data processing system command 202 exists within data processing system command library 204, then scenario constructor 206 may construct the scenario 208 including components to support execution of the command.

In the previous example, data processing system command 202 may have been defined as a command to disable the firewall on the corresponding data processing system. In addition to the definition of the command, after querying data processing system command library 204, no corresponding resolution may have been found associated with the command to disable the firewall for the data processing system. As no corresponding resolution may have been found associated with the command to disable the firewall for the data processing system, scenario constructor 206 may be activated to construct scenario 208.

To construct scenario 208, scenario constructor 206 may need to understand the elements on which a firewall depends. The elements may include a network policy, advanced authentication, packet filtering, application gateways, and/or other characteristics of a real environment that may impact how implementation of the command may impact the real environment. The network policy may define how the firewall should handle inbound and outbound traffic for IP addresses, protocols, and applications based on any security policies. Advanced authentications may include any authentication techniques that provide security beyond a traditional password, and is not limited to smart cards, authentication tokens, biometrics, and software mechanisms. Packet filtering may include monitoring incoming and outgoing packets based on the IP addresses, protocols, and ports. To manage weaknesses in the above processes, application gateways may be involved in which the host runs a proxy service to regulate connections. Scenario constructor 206 may also need to understand, for example, the host configuration, including the operating system and software configurations, particularly those with which the firewall may interact using any network connection, etc. Details about the firewall and the data process system software configurations may be examples of components which scenario constructor 206 may need to ascertain in constructing scenario 208.

Scenario 208 may be implemented using one of more data structures which may include elements used to execute data processing system command 202. Elements used to run data processing system command 202 may include a container, virtual machine, blueprint, etc. In addition to including a container, virtual machine, or blueprint, additional software configurations may be necessary, which may depend on the type of command and applications run by the command. By virtualizing the hardware and software, a scenario may be constructed in which to execute data processing system command 202.

In the previous example, data processing system command 202 may have been defined as a command to disable the firewall on the corresponding data processing system. In order to simulate the effects or change in security from disabling the firewall, a scenario may need to be constructed to create the setting in which the command may be executed. In order to create the setting around the command, scenario constructor 206 may not only need to know the operating system and software configurations of the command, but scenario constructor 206 may also need to know details about the firewall configuration and adjacent security settings. All of these configurations may be included towards construction of a scenario 208. In constructing scenario 208, a container, virtual machine, or blueprint may be built which may include all of the above configurations. In including all of the above configurations, data processing system command 202 may be run using scenario 208 within digital twin 210.

Digital twin 210 may be implemented using a one or more processes which execute data processing system command 202. Execution of data processing system command 202 may take place through virtualization of scenario 208 on digital twin 210. Through installation of scenario 208 on digital twin 210, digital twin 210 may virtualize the hardware and software configurations necessary to execute data processing system command 202. Through virtualization and subsequent execution of data processing system command 202, the effects of data processing system command 202 may be observed to further assess system performance of digital twin 210.

In the previous example, data processing system command 202 may have been defined as a command to disable the firewall on the corresponding data processing system. Scenario 208 may have been created with scenario constructor 206 to account for hardware and software configurations around which data processing system command 202 may be executed. Through installation of scenario 208 on digital twin 210, virtualization of hardware and software configurations may take place on the digital representation of the corresponding data processing system. Upon installation and virtualization of scenario 208, data processing system command 202 may be executed on the digital representation of the corresponding data processing system. As data processing system command 202 may be a command to disable the firewall, digital twin 210 may respond by mimicking the effects of data processing system with a disabled firewall.

Response 212 may be implemented using one or more data structures which account for the effects of executing data processing system command 202 on digital twin 210. The effects of executing data processing system command 202 on digital twin 210 may be simulated using scenario 208. Through virtualization of hardware and software configurations, scenario 208 may permit data processing system command 202 to be executed and may permit response 212 to manifest on digital twin 210. In the manifestation of response 212 on digital twin 210, a representation of real-world effects may transpire on digital twin 210 because of data processing system command 202.

In the previous example, data processing system command 202, a command to disable the firewall, may have been executed on digital twin 210 using virtualization of hardware and software configurations provided by scenario 208. Response 212 may include (i) the opening or all or more ports than were open before the command was executed; (ii) data packets may enter and exit the network associated with digital twin 210 unrestricted; (iii) network connection speed might increase; and (iv) warnings from software that use the network that require an enabled firewall. The set of possibilities within Response 212 may make the network associated with digital twin 210 more vulnerable to incoming traffic, potential malware, or even to a denial of service attack. Given the possible outcomes, interpreter 214 may conduct an analysis of all the outcomes on digital twin 210.

Interpreter 214 may be implemented using a one or more processes which digests response 212 as a result of executing data processing system command 202. Observation of response 212 may include an analysis of responses by hardware and software configurations in scenario 208 on digital twin 210. For example, response 212 may include information reflecting the operation of the hardware and software components of digital twin 210 during performance of scenario 208. The information may be analyzed to identify how the configurations (e.g., modified by data processing system command 202) impacted the resulting operation of the hardware and/or software. As response 212 may include an analysis of effects on digital twin 210, response 212 may seek to evaluate all the possible effects of executing data processing system command 202 on digital twin 210.

In the previous example, data processing system command 202, i.e., a command to disable the firewall, may have been executed on digital twin 210 using virtualization of hardware and software configurations provided by scenario 208. Upon execution of data processing system command 202, a set of potential responses may have been noted. Though not an exhaustive list was given, response 212 may be expected to analyze the effect of disabling the firewall throughout all the components of scenario 208 on digital twin 210. As a result of an analysis of the effects throughout digital twin 210, the list of responses that may be included in response 212 may be comprehensive. Further, response 212 may rank the impact of each response from components of scenario 208 on digital twin 210. Upon analysis and collection of responses that comprise response 212, interpreter 214 may yield decision 216.

Decision 216 may be implemented using one or more data structures which may be formulated by interpreter 214. In formulation by interpreter 214, decision 216 may result from the organization and ranking of a collection of varying responses made by scenario 208 on digital twin 210 as a result of the execution of data processing system command 202. The effects from response 212 may be used to determine if interpreter 214 will permit execution of data processing system command 202 on the corresponding data processing system, as dictated by decision 216. Upon declaration of decision 216 by interpreter 214, decision 216 may be recorded in data processing system command library 204 for when data processing system command 202 may be queried in further events involving simulation cycle 200.

In the previous example, data processing system command 202, a command to disable the firewall, may have been executed on digital twin 210 and the effects of execution on digital twin 210 may have been organized according to impact on digital twin 210 by interpreter 214. Based on the effects of disabling the firewall on digital twin 210, interpreter 214 may have found high risk associated with permitting unrestricted incoming and outgoing network traffic on digital twin 210. Further, scenario 208 may have contained software configurations that utilized the network on digital twin 210, which may have required an active firewall. These conditions, among other effects, may have caused interpreter 214 to give decision 216 that mandated that to not permit execution of the command to disable the firewall. As required by simulation cycle 200, decision 216 may be recorded in data processing system command library 204 in the data processing system so that any attempt to disable a firewall on the data processing system may be restricted.

Upon recording of decision 216 in data processing system command library 204, the security model, after having evaluated data processing system command 202, may be deployed from the deployment manager to the data processing system. Once deployed to the data processing system, the security model may send further commands from the data processing system to the deployment manager that may not have been pre-simulated by the security model and have corresponding resolutions that may not exist within data processing system command library 204. Additionally, further commands that may have been pre-simulated and have corresponding resolutions that may exist within data processing system command library 204 may not be sent to the deployment manager by the security model for evaluation.

Thus, as shown in FIG. 2A, a system in accordance with an embodiment may identify a command called data processing system command 202. Execution of the command may be simulated with digital twin 210 in order to assess effectiveness and to understand any benefit or detriment to system performance or security of the digital twin. Upon assessment of system performance and security, decision 216 may be made to further permit or restrict execution of data processing system command 202 on the corresponding data processing system.

Turning to FIG. 2B, a data flow diagram illustrating deployment of a security model in accordance with an embodiment is shown. Deploying the security model to a data processing system may facilitate mitigation of threats to the operation of the data processing system.

The security model may be based on various associations between commands that may be encountered by a data processing systems and decision for those commands based on simulations of how the commands may impact the operation of the data processing systems. For example, association 220 may include data processing system command 222 that may have been evaluated by security model 226A. As a result of evaluating data processing system command 222, decision 224 also may exist alongside data processing system command 222 and may dictate whether data processing system command 222 may be permitted to run in the data processing system associated with security model 226A. Any number of associations may be added to various security models thereby allowing for data processing systems to understand how to process (or not to process) certain commands.

Once established, security model 226A may be deployed to data processing system 228. Once deployed, data processing system 228 may evaluated newly obtained commands using the associations included in security model 226A. If a command is received for which no association exists, security model 226A may send such commands to the deployment manager for evaluation.

As security model 226A may exist among a set of security models within security model set 226, each security model may be established for and deployed to separate data processing systems. Different security models may include different associations, depending on, for example, the type of the data processing system to which the security model will be deployed.

Association 220 may relate data processing system command 222 and decision 224. Data processing system command 222 and decision 224 may be linked by the simulation of data processing system command 222 on security model 226A with a digital representation of data processing system 228, which may be similar to digital twin 210 from FIG. 2A. Through the simulation of data processing system command 222 on a digital representation of data processing system 228, decision 224 may have been determined, which may either permit or restrict execution of data processing system command 222 on data processing system 228.

Data processing system command 222 may be implemented using one of more data structures that includes information pertaining to a command. The command may be used to run a process on data processing system 228 associated with data processing system command 222. In running the process, instruction of the command may be followed by data processing system 228.

Similar to data processing system command 202 described with respect to FIG. 2A, data processing system command 222 may be any command which data processing system 228 may be instructed to run. As in the example from FIG. 2A, data processing system command 222 may be a cryptographically signed command to disable the firewall that may be active on the corresponding data processing system. As this may be a cryptographically signed command, the source of the command may be verified. Despite that the command may be cryptographically signed, in order to verify any benefit of the command to the data processing system, the data processing system may begin the simulation cycle from FIG. 2A to evaluate the command based on simulating the command with a virtual representation of the data processing system 228.

Decision 224 may be implemented using one or more data structures which may be formulated by interpretation of the effects of a simulation ran by executing data processing system command 222. The effects of the simulation may be used to determine if data processing system command 222 may be permitted execution on data processing system 228, as dictated by decision 224. Upon declaration, decision 224 may be recorded in the command library associated with data processing system 228, if data processing system command 222 may be attempted again for execution on data processing system 228.

Similar to decision 216, described with respect to FIG. 2A, decision 224 may be any decision which permits or restricts execution of command data processing system command 222. As in the example from FIG. 2A, data processing system command 222 may be a cryptographically signed command to disable the firewall that may be active on the corresponding data processing system. Upon execution of data processing system command 222 by security model 226A within the deployment manager, security model 226A may have found high risk associated with execution of data processing system command 222, which may have included unrestricted incoming and outgoing network traffic associated with the simulation referenced by simulation cycle 200 in FIG. 2A. As a result of the high risk associated with disabling the firewall, decision 224, similar to decision 216, may restrict disabling of the firewall on data processing system 228.

Security model set 226 may include security models 226A-226N (which may be any number of models). Each security model of security models 226A-226N may be associated with a data processing system, or a type of data processing system. In an association with a data processing system, security models 226A-226N may be responsible for initiating simulation of the execution of a command when a data processing system does not contain a pre-simulated result within a command library, similar to data processing system command library 204 from FIG. 2A, and initiating formulation of a decision whether to execute the command based on any benefit to the data processing system.

Security model 226A may be responsible for initiating simulation of data processing system command 222 when a pre-simulated result may not exist within a command library. As they may be found in the command library, pre-simulated results may dictate whether to permit or restrict execution of data processing system command 222. Following simulation cycle, similar to simulation cycle 200 in FIG. 2A, data processing system command 222 may be sent to the deployment manager to be simulated. The result of the simulation is a decision, similar to decision 216, which may be used to resolve whether to implement data processing system command 222 in data processing system 228.

As decision 224 may have been to restrict disabling of the firewall for data processing system 228, security model 226A may have been responsible for initiating simulation of data processing system command 222. As security model 226A may have been responsible for initiating simulation of data processing system command 222, the command to disable the firewall may not have had a pre-simulated result within data processing system 228. Once security model 226A may have initiated simulation of data processing system command 222, data processing system command 222 may have been sent to the deployment manager to simulate the command. After simulating the command, the deployment manager may have formulated a decision, with which the command library may have been updated in data processing system 228.

Data processing systems 228 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Security model 226A may have been deployed to data processing system 228. In being deployed, security model 226A and data processing system 228 may not have a pre-simulated result in its command library, similar to data processing system command library 204 from FIG. 2A, for the disabling of a firewall. Upon simulation of the command by security model 226A and formulation of decision 224 to restrict disabling of the firewall on data processing system 228, data processing system 228 not only may have an updated version of security model 226A with a new simulated result, but decision 224 may also have been added to the command library within data processing system 228.

Thus, as shown in FIG. 2B, a system in accordance with an embodiment may identify association 220 which may relate data processing system command 222 and decision 224. Given data processing system command 222, security model 226A may permit data processing system 228 to decide whether to implement data processing system command 222 based on the impact of data processing system command 222 to data processing system 228. By determining of the impact of data processing system command 222 to data processing system 228, decision 224 may be formulated.

Turning to FIG. 2C, a data flow diagram illustrating processing of a command in accordance with an embodiment is shown. To process the command, data processing system 232 may, after verifying that the command is from a trusted entity, determine whether implementation of the command will have a beneficial effect on data processing system 232.

To make the determination, data processing system 232 may include security model 232A alongside all remaining components that may permit commands be executed by data processing system 232.

When new command 230 is considered for execution, data processing system 232 may query if the command has been instantiated by a trusted source. In confirming that new command 232 has been instantiated by a trusted source, data processing system 232 may check for a cryptographic signature. Once the cryptographic signature of new command 230 may have been verified (presume that, in this example, the cryptographic signature indicates that new command 230 is from the or at least attested by the trusted source), data processing system 232 may query the command library, similar to data processing system command library 204 in FIG. 2A, to see if new command 230 may have been simulated by deployment manager 234 in a previous simulation cycle. If new command 230 was simulated in a previous simulation cycle, data processing system 232 may look up the decision whether to execute the command, similar to decision 216 in FIG. 2A, and follow that decision in the command library. Conversely, if new command 230 was not found in the command library, then security model 232A may ingest new command 230 and may be digested by deployment manager 234 to initiate simulation of the command by deployment manager 234.

In simulating new command 230, deployment manager 234 may run a simulation cycle, similar to simulation cycle 200 in FIG. 2A. In running the simulation cycle, deployment manager may create an environment similar to data processing system 232 in which to execute new command 230. In executing new command 230, deployment manager may use security model 232A and a digital representation of data processing system 232, similar to digital twin 210 in FIG. 2A, to analyze the benefits of executing new command 230. After execution of new command 230, deployment manager 234 may return yes or no (e.g., a decision), which may be the contents of decision 216 in FIG. 2A. The return of yes or no may represent the response by deployment manager 234 to run new command 230 on data processing system 232.

New command 230 may be implemented using one of more data structures that includes information pertaining to a command. The command may be used to run a process on data processing system 232. In running the process, instruction of the command may be followed by data processing system 232.

New command 230 may be a command in consideration for execution by data processing system 232. An example for new command 230 given here may be an arbitrary command, the result of which may be unknown, yet the command may contain one or more of the special characters within the set of "& |; $ < >' \ !". As the command may contain one of more of these special characters, the command may execute from, for example, a secure shell command, or execute special system settings. As these special characters may execute system commands or settings, commands with these special characters may be preferably executed by, for example, a system administrator or a user with special privilege settings. As commands with special characters may be preferably executed by users with special privilege, then commands with special characters may be preferably not executed by a malicious actor, even if a command with special characters may be cryptographically signed yet compromised by a malicious actor. Whether the command with special characters may be from a trusted source and cryptographically signed, any benefit of the command with special characters may need to be ascertained. In order to ascertain any benefit of a command with special characters, the command may need to be simulated by security model 232A to understand the effects of the command on data processing system 232.

Data processing system 232 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Security model 232A may have been deployed to data processing system 232. In having been deployed to data processing system 232, security model 232A may be responsible for evaluating commands on behalf of data processing system 232. In evaluating commands on behalf of data processing system 232, security model 232A may prompt a query of new command 230 in command library, similar to data processing system command library 204 in FIG. 2A, In the query of new command 230 in the command library, a pre-simulated decision, similar to decision 216 in FIG. 2A, may be found which may determine whether new command 230 may be executed on data processing system 232. However, if a pre-simulated decision may not be found, then security model 232A may package new command 230 and be ingested by deployment manager 234 to simulate new command 230 by deployment manager 234 to understand any benefit from execution of the command to data processing system 232.

In the previous example for new command 230, new command 230 may be an arbitrary command of unknown effects and may contain one or more of the special characters within the set of "& |; $ < > '\!". Security model 232A may prompt a query of new command 230 within the command library, similar to data processing system command library 204 in FIG. 2A, for data processing system 232 and find that no command may exist within the library. Since new command 230 may not have been found within the command library, security model 232A may package the command with special characters and be digested by deployment manager 234 in order to execute new command 230 using a digital representation of data processing system 233, similar to digital twin 210 in FIG. 2A.

Deployment manager 234 may include one or more security models in which a simulation cycle, similar to simulation cycle 200 in FIG. 2A, may be run. In running a simulation cycle, deployment manager 234 may execute a command packaged within security model 232A with a digital representation of data processing system 232, similar to digital twin 210 in FIG. 2A. In executing the command, deployment manager 234 may seek to formulate a decision, which may include permitting or restricting execution of the command on data processing system 232. In formulating a decision, deployment manager 234 may then deploy security model 232A with the decision and as well update the command library, similar to data processing system command library 204 in FIG. 2A, which data processing system 232 may query should it be called again to execute new command 230 at another time.

In the previous example for new command 230, new command 230 may be an arbitrary command of unknown effects and may contain one or more of the special characters within the set of "& |; $ < >' \!". As data processing system 232 may not have new command 230 within its command library, security model 232A may package new command 230 and be ingested by deployment manager 234 to simulate new command 230 to understand any benefit from execution of the command to data processing system 232. In simulating new command 230 by executing new command 230 with a digital representation of data processing system 232, similar to digital twin 210 in FIG. 2A, deployment manager 234 may find that new command 230, in utilizing the special characters, may have detrimental effects to the digital representation of data procession system 232. Effects that special characters may impart on the command line may include deletion of multiple files, interruption of other executing commands, and execution of system operation commands. Deployment manager 234 may find that new command 230 upon execution may cause one of these effects. As a result of observing at least one of these effects, deployment manager 234 through its simulation cycle, similar to simulation cycle 200 of FIG. 2A, may formulate a decision, similar to decision 216 of FIG. 2A, that restricts execution of new command 230 on data processing system 232. After formulating a decision to restrict execution of new command 230, deployment manager 234 may redeploy security model 232A alongside its decision to data processing system 232, In addition, data processing system 232 may update its command library with the decision concerning new command 230.

Thus, as shown in FIG. 2C, a system in accordance with an embodiment may identify application of new command 230 with data processing system 232. To identify the impact of new command 230 on data processing system 232, security model 232A may initiate simulation of new command 230 in deployment manager 234. Through simulation of new command 230, deployment manager 234 may formulate a yes or no decision, which may dictate whether to execute new command 230 on data processing system 232.

Turning to FIG. 2D, a data flow diagram illustrating processing of a command in accordance with an embodiment is shown. In contrast to the example processing described with respect to FIG. 2C, now consider an example scenario in which repeat command 240 is received by data processing system 242. In contrast to new command 230, the effect of repeat command 240 may already have been simulated. The result of that simulation may have been integrated into security model 242A.

To process repeat command 240, repeat command 240 may be ingested by security model 242A. As the name for repeat command 240 may imply, repeat command 240 at some previous point may have been a new command which was ingested by security model 242A (or another security model hosted by a different data processing system that may be similar to data processing system 242). Because repeat command 240 may at some point have been previously ingested by a security model and a simulation result may have been used to populate security model 242A, a decision based on a previously simulated instance of repeat command 240 within a deployment manager with a digital representation, similar to digital twin 210, of data processing system 242 may have been performed.

Since a decision, similar to decision 216 in FIG. 2A, whether to permit or restrict the execution of repeat command 240 may have already been formulated by a deployment manager, security model 242A may already have sufficient information to decide whether to process repeat command 240.

To make the decision, a query of the command library from security model 242A may be performed. Upon performing a query of repeat command 240 in the command library, security model 242A may find that the command library may return a decision, in this example called restricted action 244. Restricted action 244 may indicate that execution of repeat command 240 is to be restricted or otherwise limited. Based on the returned decision, data processing system 242 may elect to not execute repeat command 240.

Repeat command 240 may be implemented using one of more data structures that includes information pertaining to a command. The command may be used to run a process on data processing system 242. In running the process, instruction of the command may be followed by data processing system 242.

As an example for FIG. 2D, repeat command 240 may be a system command that directly utilizes root functions. Repeat command 240 may have been previously simulation by a deployment manager for data processing system 242. In having been previously simulated, the deployment manager for data processing system 242 may have returned a decision, similar to decision 216 in FIG. 2A, that may restrict execution of the command within data processing system 242. Execution of repeat command 240 may have been restricted because it utilizes system commands that have root permissions and exposure to commands with root permissions may give unwarranted privilege to the user who may have requested execution of repeat command 240. In this example, despite that repeat command 240 may have been restricted from execution in a previous time, the same or another user, or even a malicious actor, may be calling for the execution of repeat command 240 within data processing system 242.

Data processing system 242 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Security model 242A may have been deployed to data processing system 242. In being deployed to data processing system 242, security model 242A may monitor for incoming commands in consideration for execution on data processing system 242. As security model 242A may monitor for incoming commands, security model 242A may receive incoming commands, including repeat command 240, and prompt a query of the command in the command library, similar to data processing system command library 204 in FIG. 2A, to establish if the incoming command may have already been pre-simulated by the deployment manager for data processing system 242.

For the example for FIG. 2D, repeat command 240 may be a system command that directly utilizes root functions. Upon receiving repeat command 240, security model 242A may prompt a query to the command library of data processing system 242 to find if repeat command 240 may have been pre-simulated by the deployment manager for data processing system 242. In querying for repeat command 240 in the command library, security model 242A may find that repeat command 240 may exist there with the decision to restrict execution of repeat command 240. In finding the decision to restrict execution of repeat command, security model 242A may return restricted action 244.

Restricted action 244 may be implemented using one of more data structures that includes information pertaining to a command. The command may have been denied permission to a process on data processing system 242. In being denied permission to run a process on data processing system 242, the information pertaining to the command may be returned to the source who had prompted for execution of the command.

For the example for FIG. 2D, repeat command 240 may be a system command that directly utilizes root functions. A query of the command library associated with data processing system 242 by security model 242A may have returned restricted action 244. As the query returned restricted action 244, data processing system 242 may be restricted from execution repeat command 240. Upon discovery of this restriction of repeat command 240, the remote source that prompted for execution of repeat command 240 on data processing system 242 may receive notification that repeat command 240 may not be executed on data processing system 242.

Thus, as shown in FIG. 2D, a system in accordance with an embodiment may identify ingestion of repeat command 240 by security model 242A in data processing system 242. In ingesting repeat command 240, security model 242A may query the command library to ensure that repeat command 240 may have been executed at a previous time. In ensuring that repeat command 240 may have been executed at a previous time, repeat command 240 may be deemed as restricted action 244 on data processing system 242.

Figure 3A:
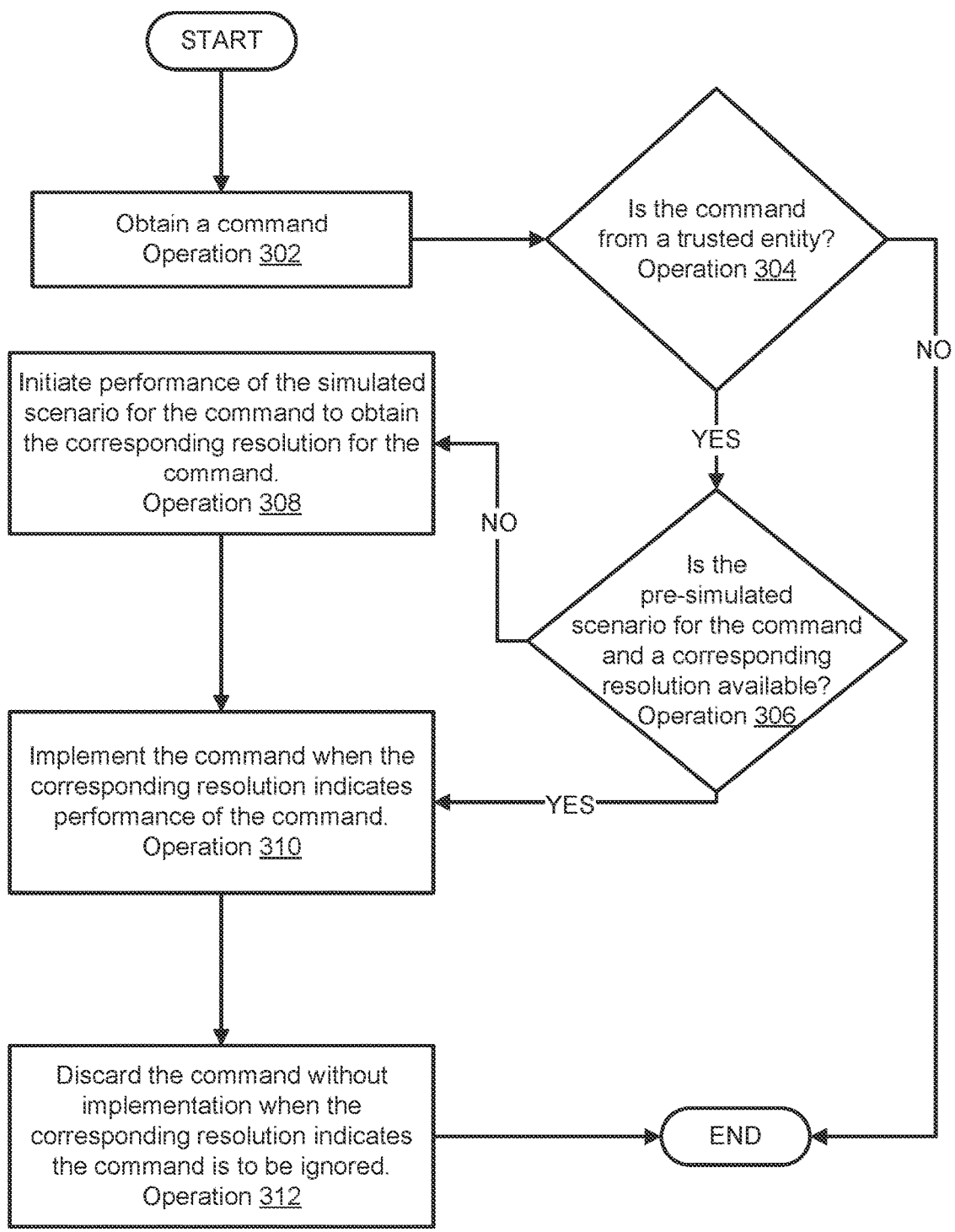
FIGS. 3A-3B show flow diagrams illustrating a method of managing operation of data processing systems in accordance with an embodiment.
Figure 3B:
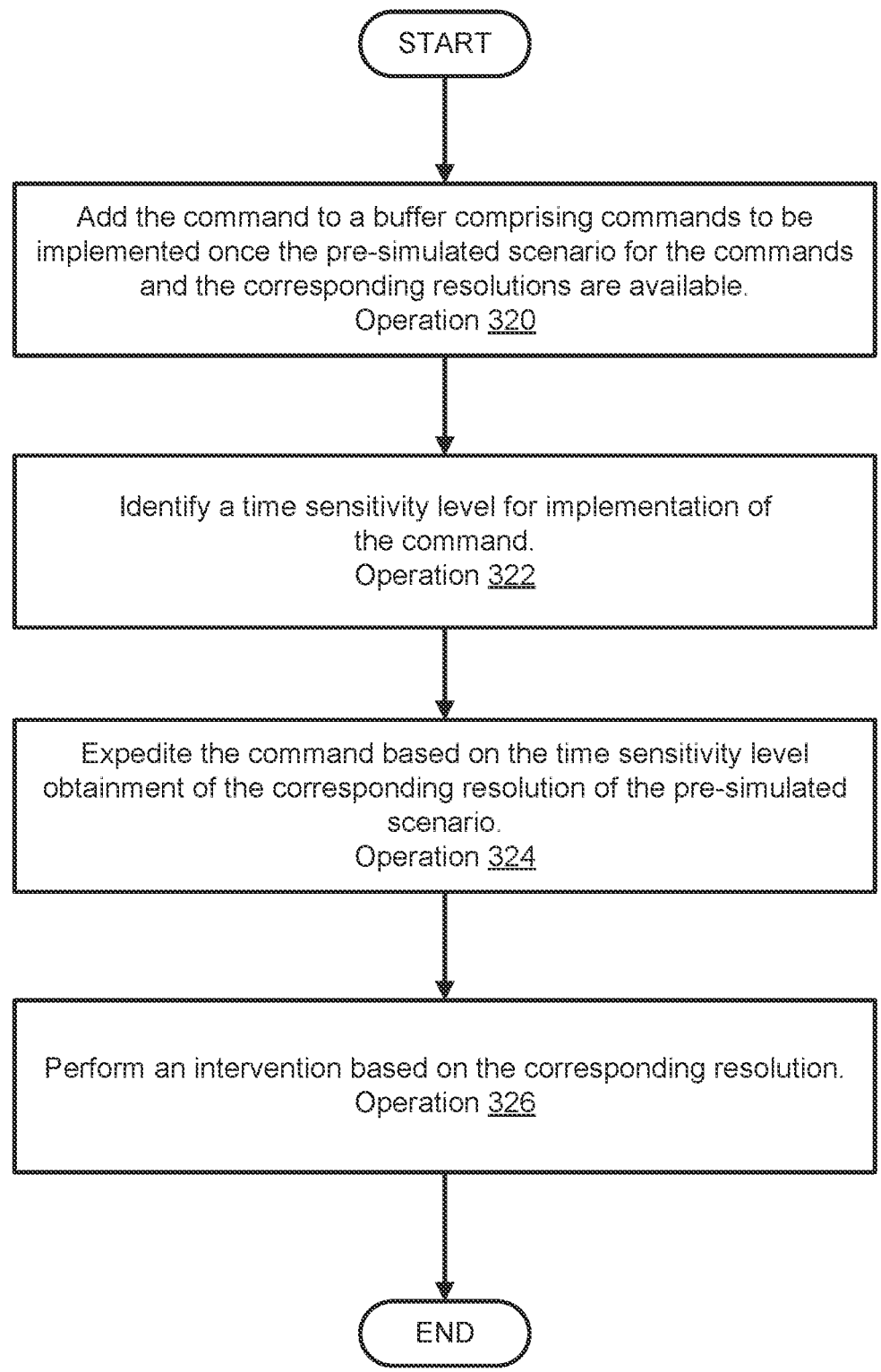

As discussed above, the components of FIG. 1 may perform various methods to implement commands with a scenario using the deployment manager. FIGS. 3A-3B illustrate methods that may be performed by the components of FIG. 1. Turning to FIG. 3A, a flow diagram illustrating implementation of a command in accordance with an embodiment is shown. The operation may be performed, for example, by a public or private data system, provided by the same location as a data processing system or by a cloud service.

At operation 302, a command may be obtained by a data processing system of the deployment. The command may be obtained by reading the command from input by a remote source that may be a user, another data processing system, or any other type of entity.

At operation 304, a determination may be made regarding whether the command is from a trusted entity. The determination may be made by checking the cryptographic signature associated with the command to assess the trustworthiness of the remote source. The cryptographic signatures may be checked by using a public key for the entity alleged to have sent the command. The public key may be from a trusted source such as a key authority or other key management entity. The check may indicate whether the command has been signed by the alleged requestor for performance of the command.

If the command is a sufficiently trustworthy source, then the method may proceed to operation 306. If the command is not from a sufficiently trustworthy source, then the method may end following operation 304.

At operation 306, a determination may be made regarding whether a pre-simulated scenario for the command and a corresponding resolution for the command is available. The determination may be made by querying a command library for the data processing system to identify whether the command and the corresponding resolution exist in the command library. If the command exists in the library, then it may be determined that the pre-simulated scenario for the command and the corresponding resolution for the command is available.

If the corresponding resolution for the command exists, then the method may proceed to operation 310. If the corresponding resolution for the command does not exist, then the method may proceed to operation 308.

At operation 308, performance of a simulated scenario for the command may be initiated to obtain the corresponding resolution for the command. Performance of a simulated scenario for the command may be initiated by constructing a scenario for the command and simulating the scenario with a digital twin in the deployment manager.

At operation 310, the command may be implemented when the corresponding resolution indicates performance of the command. The command may be implemented by executing the command in the data processing system as the corresponding resolution may permit execution of the command.

At operation 312, the command may be discarded without implementation when the corresponding resolution may indicate that the command is to be ignored. The command may be discarded by not executing the command as the corresponding resolution may restrict execution of the command.

The method may end following operation 312.

Turning to FIG. 3B, a flow diagram illustrating components of operation 310, the implementation of a command when the corresponding resolution indicates performance of the command, in accordance with an embodiment is shown. The operation may be performed as a part of performance of the command.

At operation 320, the command may be added to a buffer comprising commands to be implemented once the pre-simulated scenario for the commands and the corresponding resolutions are available. The command may be added to buffer by selecting a command to be set in a buffer with a list of commands to be run based on their corresponding resolutions.

At operation 322, a time sensitivity level may be identified for implementation of the command. A time sensitivity level may be identified by recording input of a time sensitivity level input by the remote source that may be a user, another data processing system, or any other type of entity. The time sensitivity level may be identified based on a type of the command. For example, different types of commands may be associated with different time sensitivity levels with a lookup data structure. A lookup based on the type of the command may be performed to identify the time sensitivity level.

At operation 324, the command may be expedited based on the time sensitivity level obtainment of the corresponding resolution of the pre-simulated scenario. The command may be expedited by executing the command at a time according to the time sensitivity level. For example, the command may be expedited by moving it within the buffer such that a simulation for a scenario may be completed more quickly thereby allowing for a corresponding resolution for the command to be identified.

The command may be expedited by marking the command for review by a subject matter expert. The subject matter expert may review the command and identify the corresponding resolution.

At operation 326, an intervention may be performed based on the corresponding resolution. An intervention may be performed involving a subject matter expert to obtain an analysis of the command.

The method may end following operation 326.

Figure 4:
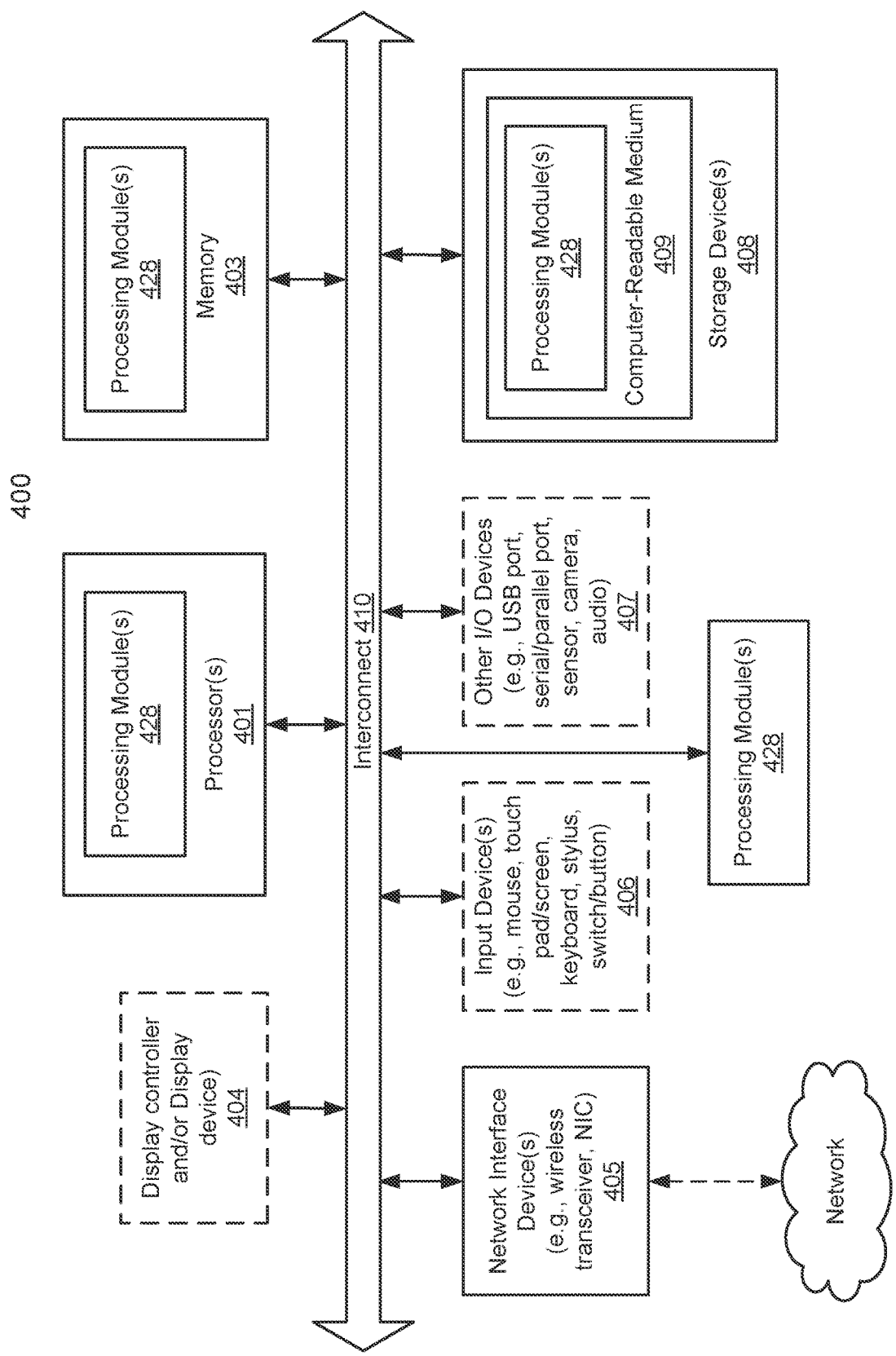
FIG. 4 shows a block diagram illustrating a data processing system in accordance with an embodiment.

Any of the components illustrated in FIGS. 1-3B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for securing a deployment, the method comprising:
    obtaining, by a data processing system of the deployment, a command; and
    prior to implementing the command:
        making a first determination regarding whether the command is from a trusted entity, and
        in a first instance of the first determination where the command is from the trusted entity:
            making a second determination regarding whether a pre-simulated scenario for the command and a corresponding resolution for the command is available;
            in a first instance of the second determination where the pre-simulated scenario for the command and the corresponding resolution for the command is available:
                implementing the command when the corresponding resolution indicates performance of the command, and
                discarding the command without implementation when the corresponding resolution indicates that the command is to be ignored; and
            in a second instance of the second determination where the pre-simulated scenario for the command and the corresponding resolution for the command are not available:
                initiating performance of a simulated scenario for the command to obtain the corresponding resolution for the command,
                implementing the command when the corresponding resolution indicates performance of the command, and
                discarding the command without implementation when the corresponding resolution indicates that the command is to be ignored.

2. The method of claim 1, further comprising:
    in a second instance of the first determination where the command is not from the trusted entity:
        discarding the command without implementation.

3. The method of claim 1, wherein the pre-simulated scenario is based on a digital twin, and the corresponding resolution is based on an evaluation of operation of the digital twin under influence of the command.

4. The method of claim 3, wherein the pre-simulated scenario and the corresponding resolution are obtained from a deployment manager that uses the digital twin to manage multiple data processing systems in the deployment.

5. The method of claim 1, further comprising:
    in the second instance of the second determination where the pre-simulated scenario for the command and the corresponding resolution for the command are not available:
        adding the command to a buffer comprising commands to be implemented once the pre-simulated scenario for the commands and the corresponding resolutions are available.

6. The method of claim 5, further comprising:
    in the second instance of the second determination where the pre-simulated scenario for the command and the corresponding resolution for the command are not available:
        identifying a time sensitivity level for implementation of the command; and
        expediting the command based on the time sensitivity level obtainment of the corresponding resolution of the pre-simulated scenario.

7. The method of claim 6, wherein expediting the obtainment comprises:
    initiating review for the command by a subject matter expert to obtain an analysis of the command; and obtaining the corresponding resolution based on the analysis of the command by the subject matter expert.

8. The method of claim 6, wherein expediting the obtainment comprises:
   prioritizing the performance of a simulated scenario for the command to obtain the corresponding resolution.

9. The method of claim 1, wherein the operations further comprise:
   in the second instance of the second determination where the pre-simulated scenario for the command and the corresponding resolution for the command are not available:
      identifying a time sensitivity level for implementation of the command; and
      expediting obtainment of the corresponding resolution of the pre-simulated scenario for the command based on the time sensitivity level.

10. A non-transitory machine-readable medium having instructions stored therein, which when executed by a processor, cause the processor to perform operations for securing a deployment, the operations comprising:
   obtaining, by a data processing system of the deployment, a command; and
   prior to implementing the command:
      making a first determination regarding whether the command is from a trusted entity, and
      in a first instance of the first determination where the command is from the trusted entity:
         making a second determination regarding whether a pre-simulated scenario for the command and a corresponding resolution for the command is available;
         in a first instance of the second determination where the pre-simulated scenario for the command and the corresponding resolution for the command is available:
            implementing the command when the corresponding resolution indicates performance of the command, and
            discarding the command without implementation when the corresponding resolution indicates that the command is to be ignored; and
         in a second instance of the second determination where the pre-simulated scenario for the command and the corresponding resolution for the command are not available:
            initiating performance of a simulated scenario for the command to obtain the corresponding resolution for the command,
            implementing the command when the corresponding resolution indicates performance of the command, and
            discarding the command without implementation when the corresponding resolution indicates that the command is to be ignored.

11. The non-transitory machine-readable medium of claim 10, wherein the operations further comprise:
   in a second instance of the first determination where the command is not from the trusted entity:
      discarding the command without implementation.

12. The non-transitory machine-readable medium of claim 10, wherein the pre-simulated scenario is based on a digital twin, and the corresponding resolution is based on an evaluation of operation of the digital twin under influence of the command.

13. The non-transitory machine-readable medium of claim 12, wherein the pre-simulated scenario and the corresponding resolution are obtained from a deployment manager that uses the digital twin to manage multiple data processing systems in the deployment.

14. The non-transitory machine-readable medium of claim 10, wherein the operations further comprise:
   in the second instance of the second determination where the pre-simulated scenario for the command and the corresponding resolution for the command are not available:
      adding the command to a buffer comprising commands to be implemented once the pre-simulated scenario for the commands and the corresponding resolutions are available.

15. The non-transitory machine-readable medium of claim 14, wherein the operations further comprise:
   in the second instance of the second determination where the pre-simulated scenario for the command and the corresponding resolution for the command are not available:
      identifying a time sensitivity level for implementation of the command; and
      expediting the command based on the time sensitivity level obtainment of the corresponding resolution of the pre-simulated scenario.

16. A data processing system, comprising:
   a processor; and
   a memory coupled to the processor to store instructions, which when executed by the processor, cause the processor to perform operations for securing a deployment, the operations comprising:
      obtaining, by a data processing system of the deployment, a command, and prior to implementing the command:
         making a first determination regarding whether the command is from a trusted entity; and
         in a first instance of the first determination where the command is from the trusted entity:
            making a second determination regarding whether a pre-simulated scenario for the command and a corresponding resolution for the command is available:
               in a first instance of the second determination where the pre-simulated scenario for the command and the corresponding resolution for the command is available:
                  implementing the command when the corresponding resolution indicates performance of the command; and
                  discarding the command without implementation when the corresponding resolution indicates that the command is to be ignored, and
               in a second instance of the second determination where the pre-simulated scenario for the command and the corresponding resolution for the command are not available:
                  initiating performance of a simulated scenario for the command to obtain the corresponding resolution for the command;
                  implementing the command when the corresponding resolution indicates performance of the command; and
                  discarding the command without implementation when the corresponding resolution indicates that the command is to be ignored.

17. The data processing system of claim 16, wherein the operations further comprise:

in a second instance of the first determination where the command is not from the trusted entity:
    discarding the command without implementation.

18. The data processing system of claim 16, wherein the pre-simulated scenario is based on a digital twin, and the corresponding resolution is based on an evaluation of operation of the digital twin under influence of the command.

19. The data processing system of claim 18, wherein the pre-simulated scenario and the corresponding resolution are obtained from a deployment manager that uses the digital twin to manage multiple data processing systems in the deployment.

20. The data processing system of claim 16, wherein the operations further comprise:
    in the second instance of the second determination where the pre-simulated scenario for the command and the corresponding resolution for the command are not available:
        adding the command to a buffer comprising commands to be implemented once the pre-simulated scenario for the commands and the corresponding resolutions are available.

\* \* \* \* \*